United States Patent
Covic et al.

(10) Patent No.: US 9,488,546 B2
(45) Date of Patent: Nov. 8, 2016

(54) TESTING EQUIPMENT FOR CRASH SIMULATION TESTS HAVING FIRST AND SECOND CARRIAGE ARRANGEMENTS

(71) Applicant: ILLINOIS TOOL WORKS INC., Glenview, IL (US)

(72) Inventors: Mario Covic, Mannheim (DE); Juergen Kraemer, Erzhausen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 222 days.

(21) Appl. No.: 14/355,951

(22) PCT Filed: Oct. 26, 2012

(86) PCT No.: PCT/US2012/062103
§ 371 (c)(1),
(2) Date: May 2, 2014

(87) PCT Pub. No.: WO2013/066747
PCT Pub. Date: May 10, 2013

(65) Prior Publication Data
US 2014/0283579 A1 Sep. 25, 2014

(30) Foreign Application Priority Data

Nov. 4, 2011 (DE) .................. 10 2011 085 791

(51) Int. Cl.
*G01M 7/00* (2006.01)
*G01N 3/30* (2006.01)
(Continued)

(52) U.S. Cl.
CPC .............. *G01M 7/08* (2013.01); *G01M 17/00* (2013.01); *G01M 17/0078* (2013.01)

(58) Field of Classification Search
None
See application file for complete search history.

(56) References Cited

U.S. PATENT DOCUMENTS 5,483,845 A * 1/1996 Stein ................. G01M 17/0078
73/12.01
5,623,094 A * 4/1997 Song ...................... G01M 7/08
73/12.04

(Continued)

FOREIGN PATENT DOCUMENTS

CN 102192826 A 9/2011
CN 102192827 A 9/2011

(Continued)

OTHER PUBLICATIONS

DE Examination Report for DE 10 2011 085 791.5 mailed Jun. 12, 2012.

(Continued)

*Primary Examiner* — Michael A Lyons
*Assistant Examiner* — Jermaine Jenkins
(74) *Attorney, Agent, or Firm* — Hauptman Ham, LLP

(57) ABSTRACT

A testing equipment for crash simulation tests is specified which has a rail arrangement, a first carriage arrangement which is arranged displaceably along a longitudinal axis of the rail arrangement, and an acceleration unit via which a force can be transferred to the first carriage arrangement in order to accelerate the carriage arrangement. With the aim of preparing parts to be tested outside the testing equipment, quickly introducing them into the testing equipment, and keeping low the overall mass composed of carriage arrangement including object to be tested, the testing equipment further has a second carriage arrangement, which can be mounted on the rail arrangement and can be displaced therealong and is designed to support a test superstructure with at least one component to be tested in the crash simulation. The first carriage arrangement further has a detachable clutch for transferring a force to the second carriage arrangement from the acceleration unit via the first carriage arrangement.

20 Claims, 1 Drawing Sheet

(51) Int. Cl.
*G01N 3/32* (2006.01)
*G01P 15/00* (2006.01)
*G01M 15/00* (2006.01)
*G01M 7/08* (2006.01)
*G01M 17/007* (2006.01)
*G01M 17/00* (2006.01)

(56) References Cited

U.S. PATENT DOCUMENTS

| | | | |
|---|---|---|---|
| 5,783,739 A | 7/1998 | Miller | |
| 5,929,348 A * | 7/1999 | Stein | G01M 7/08 73/12.07 |
| 6,675,631 B1 * | 1/2004 | Steffan | G01M 17/0078 73/12.04 |
| 2008/0011047 A1 * | 1/2008 | Dragan | G01M 17/0078 73/12.07 |
| 2010/0288013 A1 | 11/2010 | Moser et al. | |
| 2011/0192241 A1 * | 8/2011 | Aiki | G01M 17/0078 73/865.3 |
| 2012/0204630 A1 * | 8/2012 | Wallich | G01M 17/0078 73/118.01 |

FOREIGN PATENT DOCUMENTS

| | | |
|---|---|---|
| CN | 202008434 U | 10/2011 |
| DE | 220119 A1 | 3/1985 |
| DE | 19802590 A1 | 7/2002 |
| DE | 10222086 A1 | 11/2003 |
| DE | 102004029426 A1 | 1/2006 |
| JP | 2003329538 A | 11/2003 |

OTHER PUBLICATIONS

ISR for PCT/US2012/062103 mailed Feb. 4, 2013.

* cited by examiner

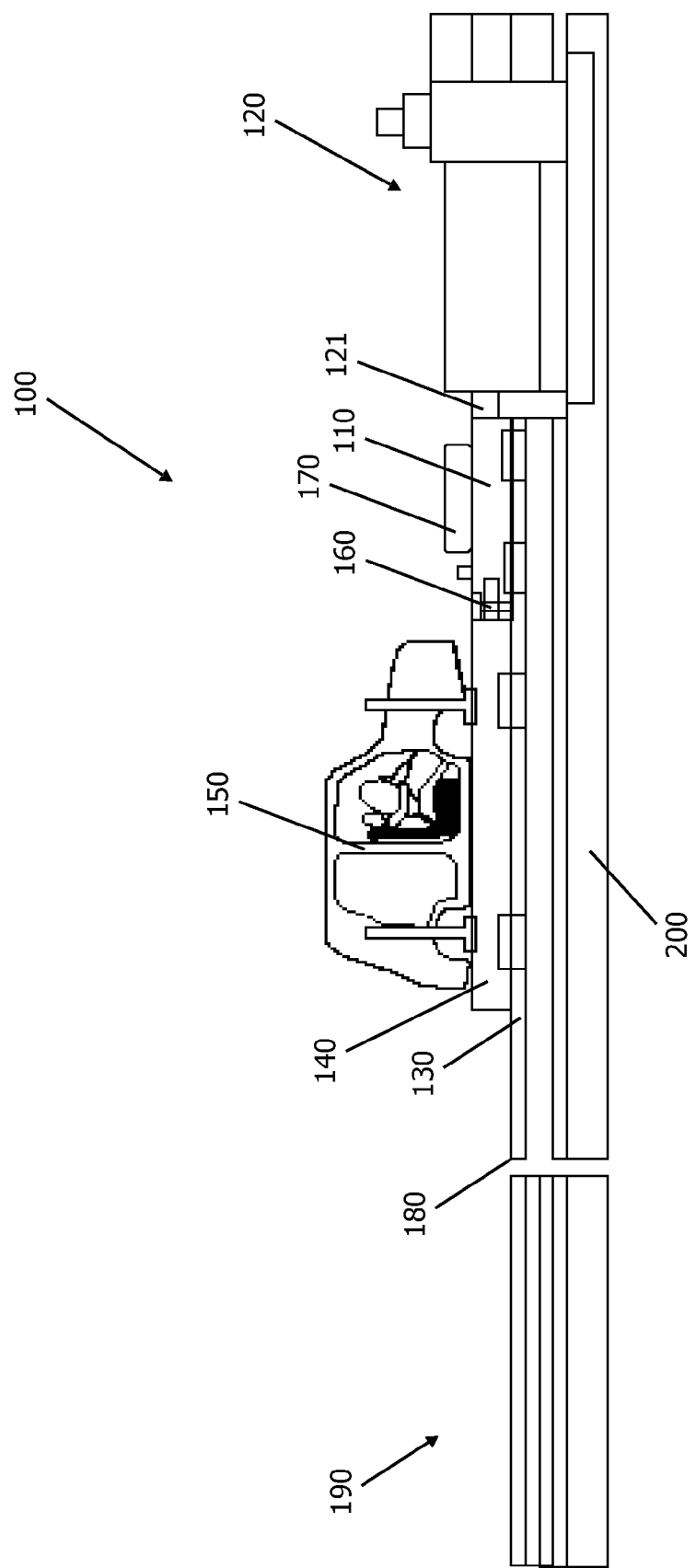

TESTING EQUIPMENT FOR CRASH SIMULATION TESTS HAVING FIRST AND SECOND CARRIAGE ARRANGEMENTS

RELATED APPLICATIONS

The present application is a National Phase of International Application Number PCT/US2012/062103 filed Oct. 26, 2012 and claims priority to German Application Number 10 2011 085 791.5 filed Nov. 4, 2011.

The invention relates to a testing equipment for crash simulation tests in accordance with the preamble of patent claim 1.

Accordingly, the invention relates to a testing equipment, for example for crash simulation for vehicle parts, for ground based transportation systems (train or motor vehicle), but also for components of non-ground based transportation systems such as, for example, aircraft seats etc. The testing equipment has a rail arrangement and a carriage arrangement for this purpose. The carriage arrangement is arranged displaceably along the rail arrangement. The testing equipment further has an acceleration unit via which a force can be transferred to the carriage arrangement in order to accelerate the carriage arrangement.

Such a testing equipment is generally known in principle, in particular from automotive engineering, and serves the purpose of taking account of the ever shorter development times in automobile construction and the requirements for greater passive safety. Such a testing equipment can be used to implement inverse crash tests. In these instances, it is not the deceleration forces capable of occurring in normal operation or in the case of a crash that influence the motor vehicle components to be investigated. Rather, in inverse crash tests the acceleration forces corresponding to the deceleration forces that can occur are introduced into the motor vehicle components to be investigated.

As a rule, in this case the components that are to be investigated, in particular motor vehicle components such as seats, steering columns and steering wheels, windshields, dashboards, safety belts and their fastening, airbag systems and other components, are accelerated in a controlled fashion corresponding to the various accident situations on a carriage arrangement in a reinforced motor vehicle body, the so-called armored body, and breakage behavior and/or component reliability are investigated.

In conventional testing equipment, the carriage arrangement is, for example, accelerated with the aid of a thrust rod which belongs to an acceleration unit and which is driven by a hydraulic piston by means of a pressurized medium from a pressure reservoir. In detail, it is known to move the thrust rod hydraulically from a cylindrical tube of a drive cylinder in accordance with a real deceleration curve. In order to be able to track the real deceleration curve an attempt is made in this case to control the hydraulic application of the thrust rod via a hydraulic valve.

The individual tests on such testing equipment can be performed in a relatively short time. However, a substantially longer preparation time is required to prepare the elements to be tested. Consequently, in the case of known testing equipment the parts to be tested are prepared in the armored body, which must be raised onto the carriage arrangement and reliably fastened thereon. Because of the high forces that occur, there is a need for stable constructions, as a result of which a certain time is also required to mount them on the carriage arrangement. It is also possible to arrange the armored body on a pallet that, in turn, is fastened on the carriage arrangement. This facilitates the exchange, but also increases the mass to be accelerated, and thus reduces the dynamics of the testing equipment.

Alternatively, it would also be possible to interchange the carriage arrangement. However, since the latter includes components for connecting to the acceleration unit, as well as measuring pickups, there is a substantial cost outlay in providing a plurality of these carriage arrangements.

On the basis of this formulation of the problem, the object of the invention is to develop a testing equipment for crash simulation tests of the type mentioned at the beginning in such a way that the parts to be tested can be prepared outside the testing equipment and then quickly introduced into the testing equipment. The aim here is for the total mass composed of carriage arrangement and object to be tested to be as small as possible in common with costs for the testing equipment being as low as possible.

With regard to the testing equipment, this object is achieved according to the invention by virtue of the fact that the testing equipment has a second carriage arrangement that can be displaced along the rail arrangement. The first carriage arrangement of the testing equipment has, moreover, a detachable clutch which is designed to engage with the second carriage arrangement in such a way that the forces exerted on the first carriage arrangement can be transferred from the acceleration unit to the second carriage arrangement, at least in part.

It is therefore advantageously possible to prepare a multiplicity of second carriages on which various test superstructures are arranged. In order to introduce another test superstructure into the testing equipment, it is possible for a completely prepared test superstructure to be moved up to the testing equipment on a second carriage arrangement and be introduced into the rail arrangement. Owing to the detachable clutch, the second carriage arrangement engages with the first carriage arrangement, with the result that acceleration or braking forces that are exerted on the first carriage arrangement also are transferred to the second carriage arrangement. Furthermore, owing to a splitting of the carriage arrangement into two parts it is possible to fasten the test superstructure directly, that is to say without pallet, on the second carriage arrangement, and thus to save the additional mass of the pallet. Nevertheless, it is possible to replace the test superstructure quickly by exchanging the second carriage arrangement.

Advantageous developments of the invention are specified in the subclaims.

It is provided in a preferred embodiment that the acceleration unit is arranged fixedly relative to the testing equipment. Consequently, there is no need for the mass of the acceleration unit itself to be accelerated, but only for the smaller mass of the carriage arrangements to be accelerated. A higher dynamics can advantageously be achieved in this way in the crash simulation.

Furthermore, it can be provided that the first carriage arrangement has one or more sensors for recording measured values. A measured value in this case is a measured acceleration value. It is also possible to use sensors to acquire other measured values, such as speed or forces that are acting. It is, inter alia, possible with the aid of these measured values to control the acceleration unit in order to allow a prescribed acceleration to act on the test superstructure.

It is particularly advantageous here that the first carriage arrangement need not be replaced in order to interchange the test superstructure, since the test superstructure is located on the second carriage arrangement, which can be coupled to the first carriage arrangement. In this way, expensive measuring apparatus need to be provided only once and not for each second carriage arrangement. Furthermore, when interchanging the test superstructure there is no need to cable the sensors anew to the acceleration unit. Again, the sensors need not be newly calibrated in each case.

In one embodiment of the testing equipment, the rail arrangement is designed for mounting the second carriage arrangement on the rail arrangement by moving in a plane in which the longitudinal axis of the rail arrangement lies. This is advantageous, since the in part substantial masses of the second carriage arrangement and of the test superstructure need not be raised from the plane that is, in most cases, horizontally aligned. Cranes and other lifting devices can be omitted.

In one embodiment, at a first end, lying opposite the acceleration unit, the rail arrangement is designed in an open fashion in such a way that a second carriage arrangement can be mounted on the rail arrangement by moving along the longitudinal axis of the rail arrangement. The second carriage arrangement can then be moved up to the end of the rail arrangement on a transport means, and be introduced in the direction of the longitudinal axis of the rail arrangement.

It is also conceivable for the rail arrangement to have a swivel unit which is designed for swiveling a segment of the rail arrangement out of the longitudinal axis of the rail arrangement. It is then advantageously possible to move the second carriage arrangement up to the swiveled-out segment of the rail arrangement on a transport means and introduce it into the segment. The segment can subsequently be swiveled in again together with the second carriage arrangement.

In an implementation of the inventive solution, it is provided that the testing equipment has a passive braking device which is designed for exerting braking forces on the first and/or second carriage arrangement without control in such a way that the first and/or second carriage arrangement comes to a standstill in front of an end of the rail arrangement opposite the acceleration unit.

When such a passive braking device is used, there is no need to provide further braking systems that ensure braking in the event of failure of the control or power supply. Thus, for example, it is possible without loss of safety to dispense with energy-consuming bodies on the rail arrangement or the end of the testing equipment situated opposite the acceleration unit, and this facilitates a simplified introduction of a second carriage arrangement.

In one embodiment, the passive braking device is implemented by eddy-current brakes that have permanent magnets and metal fins which are respectively arranged on carriages and testing equipment in such a way that upon a movement of the carriage arrangement along the rail arrangement the metal fins are moved relative to the permanent magnets and by their magnetic field. The relative movement generates in the metal fins an eddy current that causes a magnetic field so that, in interaction with the magnetic field of the permanent magnets, the magnetic field of the eddy current causes a force against the direction of movement and brakes the carriage arrangement. The braking is performed without friction, and therefore without wear.

Since the braking action increases with the relative speed between the magnet and metal fins, such a brake is effective over a wide speed range. Furthermore, at low speeds a movement relative to one another is possible with a small force such that, for example, a second carriage arrangement can be introduced slowly into the rail arrangement without the brakes being removed.

However, it is also conceivable as an alternative to this that the testing equipment has a conventional (active) braking device which can optionally be actuated in such a way that braking forces are exerted on the first and/or second carriage arrangement so that the first and/or second carriage arrangement comes to a standstill in front of an end of the rail arrangement opposite the acceleration unit. This embodiment has the advantage that the inventive aspect, specifically that of providing the testing equipment with two carriage arrangements that can be connected to one another, can also be implemented in the case of conventional rail arrangements.

An exemplary embodiment of the inventive testing equipment is described below in more detail with reference to the attached drawing, in which:

FIG. 1 shows a schematic side view of a testing equipment in accordance with the invention.

FIG. 1 shows a schematic side view of an exemplary embodiment of a testing equipment for crash simulation tests in accordance with the present invention.

The testing equipment 100 has a rail arrangement 130 that is fastened on a foundation 200. An acceleration unit 120 is arranged at one end of the rail arrangement 130.

Furthermore, the testing equipment 100 has a first carriage arrangement 110. The first carriage arrangement 110 is arranged displaceably along the rail arrangement 130. Moreover, the first carriage arrangement 110 has a clutch 160 at one end.

The testing equipment 100 further has a second carriage arrangement 140, which can be mounted on the rail arrangement 130 and can be displaced along the latter. The second carriage arrangement 140 is designed to support a test superstructure 150. Said test super-structure 150 can be fixedly connected to the second carriage arrangement 140 so that the test super-structure 150 follows all the movements and accelerations of the second carriage arrangement 140. The test superstructure 150 can comprise various components of, for example, ground based or non-ground based transportation systems that are to be tested for their behavior under extreme accelerations.

The clutch 160 of the first carriage arrangement 110 is designed to engage with the second carriage arrangement 140 so that acceleration forces can be transferred to the second carriage arrangement from the first carriage arrangement. The clutch 160 is detachable. In this way, the second carriage arrangement 140 can optionally be connected non-positively to the first carriage arrangement 110, or else be moved separately therefrom, when the clutch 160 has been detached. Possible embodiments of the clutches are, for example, a projection that is mounted on the second carriage arrangement 140 and engages in a cutout on the first carriage arrangement 110, the projection being secured against longitudinal forces by a bolt. However, it is possible here to conceive of any clutch that is capable of transferring forces along the rail arrangement to the second carriage arrangement 140 from the first carriage arrangement 110.

The testing equipment 100 has a thrust rod 121 that can be engaged with the first carriage arrangement. The thrust rod 121 can be moved and/or accelerated along the rail arrangement 130 by means of pressurized hydraulic fluid by the acceleration unit 120. In this process, the first carriage arrangement 110, which engages with the thrust rod 121, is likewise accelerated. Moreover, when the second carriage arrangement is coupled by the clutch 160 to the first carriage arrangement 110, the second carriage arrangement 140 is also accelerated by the acceleration unit via the thrust rod 121.

In addition to a hydraulic acceleration unit 120, other types of acceleration units are also conceivable as acceleration unit. These could be, inter alia, pneumatic, electric motor or else purely mechanical acceleration units. By way of example, it would be possible to conceive of electromagnetic linear motors, or else mechanical units that act mechanically on the carriage arrangements by means of a flywheel mass driven by height or torque.

The testing equipment further has a braking device which is designed to brake the first carriage arrangement 110 and the second carriage arrangement 140 again following an acceleration phase caused by the acceleration unit 120. In this case, the braking device is designed in such a way that the two carriage arrangements 110, 140 come to a standstill in front of an end 180 of the rail arrangement 130 opposite the acceleration unit.

It is advantageous for reasons of safety when the braking device is a passive braking device which is capable of braking the carriage arrangements 110, 140 without control or energy feed from outside. In this way, it is ensured that even given failure of control or power supply systems the carriage arrangements 110, 140 can be brought to a standstill safely in front of the end 180 of the rail arrangement 130.

In a preferred embodiment, the passive braking device is an eddy-current brake. Such an eddy-current brake has permanent magnets and metal fins which are respectively arranged on carriages and testing equipment in such a way that upon a movement of the carriage arrangement along the rail arrangement 130 the metal fins are moved relative to the permanent magnets and by their magnetic field. The relative movement generates in the metal fins an eddy current that causes a magnetic field such that the magnetic field of the eddy current causes a force against the direction of movement in interaction with the magnetic field of the permanent magnets. The carriage arrangement is braked in this way. The braking is performed without friction and thus without wear. A further advantage of an eddy-current brake is that the braking action increases with the speed. Consequently, for a large range of mass and speed the eddy-current brake is capable of braking the carriage arrangement reliably within the desired range. Furthermore, it is possible to move the carriage arrangement 110, 140 past the brakes with a small force at very low speeds.

Consequently, it is also possible in the case of the inventive testing equipment to leave the first end 180 of the rail arrangement open, given that the carriage arrangement is reliably braked in front of this end. There is no need for any impact bodies or other energy-consuming elements at this first end 180 of the rail arrangement. Consequently, it is also possible by using a transport means 190, for example, to bring a second carriage arrangement 140 up to the first end 180 of the rail arrangement 130. When the transport means is aligned in a position directly in the extension of the rail arrangement, the second carriage arrangement can be pushed directly onto the rail arrangement 130.

However, it is also conceivable for energy-consuming elements or other emergency braking devices to be located at the first end 180 of the rail arrangement 130. In this case, the second carriage arrangement can also be raised onto the rails from above. It would also be conceivable for a part of the rail arrangement to be swiveled out laterally so that a transport means 190 with a second carriage arrangement 140 can be moved up to this swiveled-out part of the rail arrangement 130. As previously described, the second carriage arrangement 140 can then be mounted on this swiveled-out segment of the rail arrangement 130 and swiveled in again in common with the latter.

As an alternative to this, however, it is also conceivable for the testing equipment to have a conventional (active) braking device which can optionally be actuated in such a way that braking forces are exerted on the first and/or second carriage arrangement 110, 140 so that the first and/or second carriage arrangement 110, 140 comes to a standstill in front of an end of the rail arrangement 130 opposite the acceleration unit 120. This embodiment has the advantage that the inventive aspect, specifically that of providing the testing equipment with two carriage arrangements 110, 140 that can be connected to one another, can also be implemented in the case of conventional rail arrangements.

In the case of the inventive testing equipment 100, it is provided that an acceleration sensor for recording measured acceleration values is located on the first carriage arrangement 110. The measured values recorded by this acceleration sensor 170 reproduce acceleration values over the first carriage arrangement 110 during the acceleration phase and the braking phase. Since the second carriage arrangement 140 can be coupled to the first carriage arrangement 110, the measured values of the acceleration sensor 170 also reproduce the acceleration values for the second carriage arrangement 140 and the test superstructure 150 fastened thereon. Consequently, there is no need for such sensors to be mounted on each second carriage arrangement 140. The measured values for the test superstructure 150 can be recorded by a single first carriage arrangement 110 and the acceleration sensor 170 located thereon. Moreover, it is possible for a multiplicity of further sensors to be mounted on the first carriage arrangement 110 in order to acquire measured values.

The measured values of the acceleration sensor 170 can also be used to control the acceleration unit 120. It is advantageous in this case that the first carriage arrangement 170 remains in the testing equipment when the second carriage arrangement 140 is exchanged. By way of example, in this case the cabling need not be changed, nor is there a need to undertake any new calibration measurements.

The invention is not restricted to the embodiments of the testing equipment 100 described by way of example with reference to FIG. 1, but emerges from a combination of all features and advantages described herein.

The invention claimed is:

1. A testing equipment for crash simulation tests, the testing equipment having the following:
   a rail arrangement;
   a first carriage arrangement which is arranged displaceably along a longitudinal axis of the rail arrangement, and
   an acceleration unit configured to transfer a force to the first carriage arrangement in order to accelerate the carriage arrangement;
   wherein the testing equipment has a second carriage arrangement, which is configured to be mounted on the rail arrangement and is displaceable along the longitudinal axis of the rail arrangement and is designed to support a test superstructure with at least one component to be tested in the crash simulation, the first carriage arrangement having a detachable clutch which is designed to engage with the second carriage arrangement in such a way that at least a part of the force, when present and the detachable clutch is engaged, is transferred to the second carriage arrangement from the acceleration unit via the first carriage arrangement.

2. The testing equipment as claimed in claim 1, in which the acceleration unit is arranged immovably relative to the testing equipment.

3. The testing equipment as claimed in claim 1, in which the first carriage arrangement has a sensor for recording measured acceleration values of the first carriage unit.

4. The testing equipment as claimed in claim 1, in which the rail arrangement is designed for mounting the second carriage arrangement on the rail arrangement by moving in a plane in which the longitudinal axis of the rail arrangement lies.

5. The testing equipment as claimed in claim 4, in which at a first end, lying opposite the acceleration unit, the rail arrangement is designed in an open fashion in such a way that the second carriage arrangement can be mounted on the rail arrangement by moving along the longitudinal axis of the rail arrangement.

6. The testing equipment as claimed in claim 4, in which the rail arrangement has a swivel unit which is designed for swiveling a segment of the rail arrangement out of the longitudinal axis of the rail arrangement.

7. The testing equipment as claimed in claim 1, in which the testing equipment has a passive braking device which is designed for exerting braking forces on the first and/or second carriage arrangement without control in such a way that the first and second carriage arrangements come to a standstill in front of an end of the rail arrangement opposite the acceleration unit.

8. The testing equipment as claimed in claim 7, in which the braking device is an eddy-current brake.

9. The testing equipment as claimed in claim 8, in which the eddy-current brake has permanent magnets and metal fins which are arranged on the first and/or second carriage arrangement and the rail arrangement in such a way that upon a movement of the carriage arrangement along the rail arrangement the metal fins are moved by a magnetic field of the permanent magnets.

10. The testing equipment as claimed in claim 1, in which the testing equipment has an active braking device which is configured to be actuated in such a way that braking forces are exerted on the first and/or second carriage arrangement so that the first and/or second carriage arrangement comes to a standstill in front of an end of the rail arrangement and opposite the acceleration unit.

11. The testing equipment as claimed in claim 1, in which the acceleration unit is a hydraulic acceleration unit which is designed for exerting the force of the first carriage arrangement by means of a thrust piston.

12. The testing equipment as claimed in claim 1, in which the first and the second carriage arrangements further have guide elements which are designed for restricting movements of the carriage arrangements transversely to the longitudinal axis of the rail arrangement.

13. A testing equipment for crash simulation tests, the testing equipment having the following:
a rail arrangement;
a first carriage arrangement which is arranged displaceably along a longitudinal axis of the rail arrangement, and
an acceleration unit configured to impart a force onto the first carriage arrangement in order to accelerate the carriage arrangement;
wherein the testing equipment has a second carriage arrangement mounted on the rail arrangement and is displaceable along the longitudinal axis of the rail arrangement and is configured to support a test superstructure with at least one component to be tested in the crash simulation, and
wherein the testing equipment further includes a detachable clutch which is designed to engage with the second carriage arrangement in such a way that, when the detachable clutch is engaged, at least a part of the force imparted onto the first carriage is transferred to the second carriage arrangement from the acceleration unit via the first carriage arrangement.

14. The testing equipment as claimed in claim 13, in which the acceleration unit is arranged immovably relative to the testing equipment.

15. The testing equipment as claimed in claim 13, in which the first carriage arrangement has a sensor for recording measured acceleration values of the first carriage unit.

16. The testing equipment as claimed in claim 13, in which the testing equipment has a passive braking device which is designed for exerting braking forces on the first and/or second carriage arrangement without control in such a way that the first and second carriage arrangements come to a standstill in front of an end of the rail arrangement opposite the acceleration unit.

17. The testing equipment as claimed in claim 16, in which the braking device is an eddy-current brake.

18. A testing equipment for crash simulation tests, the testing equipment having the following:
a rail arrangement;
a first carriage arrangement which is arranged displaceably along a longitudinal axis of the rail arrangement, and
an acceleration unit configured to impart a force onto the first carriage arrangement in order to accelerate the carriage arrangement away from the acceleration unit;
wherein the testing equipment has a second carriage arrangement mounted on the rail arrangement and is displaceable along the longitudinal axis of the rail arrangement and is configured to support a test superstructure with at least one component to be tested in the crash simulation, and
wherein the testing equipment further includes a detachable clutch which is designed to engage in such a way that, when the detachable clutch is engaged, at least a part of the force imparted onto the first carriage is transferred to the second carriage arrangement from the acceleration unit via the first carriage arrangement.

19. The testing equipment of claim 18, wherein the clutch comprises a projection that is mounted on the second carriage arrangement and engages in a cutout on the first carriage arrangement.

20. The testing equipment of claim 18, wherein the clutch comprises a projection that is mounted on the second carriage arrangement and engages in a cutout on the first carriage arrangement, the projection being secured against longitudinal forces by a bolt.

\* \* \* \* \*